United States Patent Office 3,553,246
Patented Jan. 5, 1971

3,553,246
PROCESS FOR PRODUCING UNSATURATED
ALIPHATIC NITRILES
Naoya Kominami, Tokyo, Hitoshi Nakajima, Urawa-shi, and Takeo Kimura and Takio Sakurai, Tokyo, Japan, assignors to Asahi Kasei Kogyo Kabushiki Kaisha, Osaka, Japan, a corporation of Japan
No Drawing. Continuation-in-part of application Ser. No. 568,373, July 28, 1966. This application Mar. 21, 1969, Ser. No. 809,410
Claims priority, application Japan, Aug. 9, 1965, 40/48,035; Oct. 20, 1965, 40/63,951; Dec. 29, 1965, 40/80,895; Feb. 9, 1966, 41/7,178
Int. Cl. C07c 121/04
U.S. Cl. 260—465.3                     6 Claims

ABSTRACT OF THE DISCLOSURE

A process for producing lower olefinic nitriles by catalytically reacting in the gas phase at 100–500° C., a gas comprising ethylene, propylene, normal butylene or isobutylene, hydrogen cyanide and oxygen or a molecular oxygen-containing gas in the presence of a hydrogen halide and a catalyst which comprises palladium and rhodium and the oxides, hydroxides, inorganic acid salts or organic acid salts thereof.

---

This application is a continuation-in-part of U.S. application Ser. No. 568,373, filed on July 28, 1966, which is now abandoned, and which claims a priority of Aug. 9, 1965, based on an application filed in Japan.

This invention relates to a process for the preparation of lower olefinic nitriles by a gas phase reaction of a lower aliphatic olefin, hydrogen cyanide and oxygen or a molecular oxygen-containing gas in the presence of a hydrogen halide.

The present inventors have previously found a process for producing such lower olefinic nitriles by catalytically reacting in the gas phase, a lower aliphatic olefin, hydrogen cyanide and oxygen or a molecular oxygen-containing gas, as disclosed in British Pat. No. 1,084,599.

As the result of further studies on the process disclosed therein, the present inventors have discovered that in the practice of the above-mentioned process by the use of palladium, rhodium or a compound thereof as a catalyst, the presence of hydrogen halide results in an increase in the yields of lower olefinic nitriles and suppresses the diminution of catalyst activity and the formation of by-products.

Thus, according to this invention there has been provided a process for producing lower olefinic nitriles of the formula:

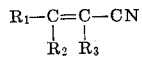

wherein $R_1$, $R_2$ and $R_3$ are independently selected from the group consisting of hydrogen and methyl, provided that no more than two members thereof are methyl. The process comprises catalytically reacting in the gas phase at a temperature of from 100° C. to 500° C., ethylene, propylene, normal butylene or isobutylene and oxygen or a molecular oxygen-containing gas, in the presence of a hydrogen halide and a catalyst comprising palladium or rhodium or a compound thereof.

To show the improvement attainable by the present invention, the results of comparative tests between the case where a hydrogen halide, e.g. hydrogen chloride, was present and the case where no such halide was present are shown in Tables 1 and 2.

TABLE 1.—EFFECT OF HYDROGEN CHLORIDE (NO. 1)

| | Yield [1] of acrylonitrile | | |
|---|---|---|---|
| Hydrogen chloride | 15 minutes after initiation of reaction | 2 hours after initiation of reaction | 6 hours after initiation of reaction |
| Present | 40 | 40 | 40 |
| Absent | 10 | 3 | 0.6 |

[1] Yield: Mol percent based on fed hydrogen cyanide.

Reaction conditions—
  Catalyst: Palladium chloride-cadmium chloride-silica gel.
  Starting material composition (volume ratio):

$C_2H_4$ : HCN : $O_2$ : $N_2$ : HCl
  47 :  19 :  13 : 120 : 0 (no HCl present)
  47 :  19 :  13 : 100 : 20 (HCl present)

Temperature: 330° C.
  Space velocity: 1500 hr.$^{-1}$

TABLE 2.—EFFECT OF HYDROGEN CHLORIDE (NO. 2)

| | Yield of— | |
|---|---|---|
| Hydrogen chloride | Acrylonitrile [1] | Propionitrile [1] |
| Present | 35 | 5 |
| Absent | 7 | 22 |

[1] Yield: Mol percent based on fed hydrogen cyanide, 15 minutes after initiation of reaction.

Reaction conditions—
  Catalyst: Palladium chloride-active alumina
  Starting material composition (volume ratio):

$C_2H_4$ : HCN : $O_2$ : $N_2$ : HCl
  30 :  10 :  6 : 48 : 0 (no HCl present)
  30 :  10 :  6 : 48 : 10 (HCl present)

Temperature: 300° C.
  Space velocity: 1250 hr.$^{-1}$

As is clear from Tables 1 and 2, the presence of hydrogen chloride (a hydrogen halide) increases the yield of acrylonitrile (an unsaturated aliphatic nitrile) and inhibits the diminution of catalyst activity and the formation of by-products.

As already indicated, the catalyst employed in the process of the present invention may comprise palladium, rhodium, palladium compounds or rhodium compounds. Of these, palladium and palladium compounds are preferred because of their higher catalyst activity and lower cost. Among the above-mentioned palladium and rhodium compounds which may be used are the oxides, hydroxides, inorganic acid salts such as chlorides, bromides, iodides, nitrates, sulfates, sulfides, cyanides and thiocyanides, organic acid salts such as oxalates, acetates, monochloroacetates, dichloroacetates and salicylates. It is preferable to employ palladium or rhodium metal in amounts of from 0.001 to 5.0 g.-atoms per kg. of the total catalyst supported on a carrier, if desired.

The activity of the catalyst may, if desired, be promoted by the addition of one or more compounds of lithium, sodium, potassium, rubidium, cesium, magnesium, calcium, strontium, barium, indium, thallium, antimony, bismuth, copper, zinc, cadmium or cerium. By the addition of the above-mentioned promoters, there are observed such effects as increased yields of unsaturated aliphatic nitriles, inhibited diminution of catalyst activity and suppressed formation of by-products, e.g., saturated aliphatic nitriles such as acetonitrile and propionitrile. More precisely, the addition of at least one lithium, sodium, potassium, rubidium or cesium compound increases the yields of unsaturated aliphatic nitriles, prevents catalyst activity from being reduced and suppresses the by-production of saturated aliphatic nitriles such as acetonitrile as impurities. On the other hand, the addition of compounds of magnesium, calcium, strontium, barium, zinc, cadmium or indium, maintains a high catalyst activity of and a high yield of the unsaturated aliphatic nitrile, and suppress the by-production of saturated nitriles, while the addition of compounds of thallium, antimony, bismuth, copper, iron, chromium, molybdenum, manganese or cerium increase the yields of unsaturated nitriles.

The compounds referred to above, of lithium sodium, potassium, rubidium, cesium, magnesium, calcium, strontium, barium, indium, thallium, antimony, bismuth, copper, zinc, cadmium and cerium which may be used in the present invention include their halides; inorganic acid salts such as sulphates, nitrates, phosphates, selenites, carbonates and chlorates; organic acid salts such as acetates, oxalates and citrates; cyanides; thiocyanides; hydroxides and oxides.

Besides the promoter mentioned above, the catalysts of the present invention may further, if desired, include compounds of beryllium, scandium, yttrium, titanium, zirconium, hafnium, vanadium, niobium, tungsten, cobalt, nickel, mercury, tin, lead and arsenic, phosphoric and sulphuric acids, the oxides and chlorides of selenium and tellurium, metallic gold and compounds thereof, silver, ruthenium, platinum and osmium. The amount of the metals of the above-mentioned promoters is preferably in the range of from 0.001 to 50.0 g.-atoms per kg. of the total catalyst supported on a carrier, if desired.

The main products of the process of the present invention are acrylonitrile when ethylene is used as the starting material; methacrylonitrile and crotononitrile when propylene is used; $a,\beta$-dimethylacrylacrylonitrile and ethylacrylonitrile when normal butylene is used; and $\beta,\beta$-dimethylacrylonitrile when isobutylene is used.

The hydrogen halides to be used in the process of the present invention are hydrogen chloride, hydrogen bromide and hydrogen iodide, and from the economical viewpoint, the use of hydrogen chloride is preferable.

As to methods of preparing the catalysts employed, any conventional method such as a mixing method, immersion method or heating method may be employed. A carrier may or may not be employed though it is preferable to employ the same. The carrier may be any type that is generally employed as a carrier, and is preferably selected from those having a relatively large surface area, for example, silica, carbon, alumina, silica-alumina, molecular sieves or silicates. Silica gel is especially preferred in view of its catalyst activity and catalyst life.

As to the composition of the gaseous starting materials to be used in the present invention, the volume ratio of hydrogen cyanide is preferably between 20 volumes and $\frac{1}{50}$ volume based on one volume of ethylene, propylene, normal butylene or isobutylene, the volume ratio of oxygen is preferably $\frac{1}{1000}$–1 volume based on one volume of the gas mixture of hydrogen cyanide and ethylene, propylene, normal butylene or isobutylene and the volume ratio of the hydrogen halide is preferably between 20 volumes and $\frac{1}{100}$ volume based on one volume of hydrogen cyanide. However, the process of the present invention is practicable even when the composition of starting gas is outside these ranges.

When carrying out the process of the present invention, an inert gas or a gas of relatively low reactivity may be present with the above-mentioned gaseous starting material, but its presence is not essential. Examples of inert gases or gases of relatively low activity are nitrogen, carbon dioxide, carbon monoxide, steam, methane, ethane, propane and butane.

The presence of hydrogen halide permits the maintenance of a high activity of the catalyst. However, there may be observed a diminution of the activity of the catalyst under exceptional conditions. In such a case, the activity of the catalyst can be regenerated by discontinuing the introduction of feed gas and treating the catalyst with an air or oxygen-containing gas at an elevated temperature, preferably at a temperature between 200° C. and 600° C.

The temperature to be applied to the present invention is generally from 100° C. to 500° C., preferably from 200° C. to 450° C. The pressure in the present invention may be atmospheric pressure. The reaction may also be effected under super-atmospheric pressure. The space velocity is preferably from 20 hr.$^{-1}$ to 20,000 hr.$^{-1}$, but the invention is practicable even at space velocities outside this range.

The reaction process may be of the fixed bed type or the fluidized bed type.

In the process of the present invention, the chlorides of ethylene and/or propylene are scarcely produced as by-products except that a negligible amount of by-products e.g., ethyl chloride and vinyl chloride, are noticed only at the initial stage of the reaction in the case where ethylene and hydrogen chloride are employed.

The following examples illustrate the invention.

EXAMPLE 1

100 ml. of silica gel was immersed in an aqueous hydrochloric acid solution of 4.3 g. of palladium chloride, and the mixture was vaporized to dryness on a water bath. The dried substance was charged into an aqueous solution containing 8.3 g. of potassium iodide, and the resulting mixture was again vaporized to dryness on a water bath to prepare the catalyst. 8 ml. of the catalyst was filled into a hard glass U-tube having an outer diameter of 12 mm., and the tube was maintained in a nitre bath heated to 330° C. The term "nitre bath" as used herein refers to a bath comprising a fused mixture of approximately equal amounts of sodium nitrate and potassium nitrate.

To the reaction tube, a mixed gas comprising ethylene, hydrogen cyanide, oxygen, hydrogen chloride and nitrogen in a volume ratio of 50:10:10:20:24 was fed at a space velocity of 1500 hr.$^{-1}$. As a result, 15 minutes after initiation of the reaction, 97% of the fed hydrogen cyanide was converted, and acrylonitrile in a yield of 95 mol percent based on the converted hydrogen cyanide was obtained. In addition thereto, 1.1 mol percent based on the fed hydrogen cyanide of propionitrile and 0.4 mol percent based on the fed hydrogen chloride of ethyl chloride were formed. Further, 3 hours after initiation of the reaction, 85% of the fed hydrogen cyanide was converted, and acrylonitrile in a yield of 86 mol percent based on the converted hydrogen cyanide was obtained. In addition, 2 mol percent based on the fed hydrogen cyanide of propionitrile and 0.2 mol percent based on the fed hydrogen chloride of ethyl chloride were obtained.

EXAMPLE 2

Using a catalyst as prepared in Example 1, a mixed gas comprising ethylene, hydrogen cyanide, oxygen, hydrogen chloride and nitrogen in a volume ratio of 50:10:5:25:33 was reacted at a temperature of 330° C. and a space velocity of 1500 hr.$^{-1}$. As a result, 15 minutes after initiation of the reaction, 80% of the fed hydrogen cyanide was converted, and acrylonitrile was obtained in a yield of 90 mol percent based on the converted hydrogen cyanide. In addition thereto, 1.3 mol percent based on the fed hydrogen cyanide of propionitrile and 2 mol percent based on the fed hydrogen chloride of ethyl chloride were by-produced.

3 hours after initiation of the reaction, 65% of the fed hydrogen cyanide was converted, and 88 mol percent of the converted hydrogen cyanide became acrylonitrile. Besides, 3 mol percent based on the fed hydrogen cyanide of propionitrile and 1.2 mol percent based on the fed hydrogen chloride of ethyl chloride were by-produced.

EXAMPLE 3

An aqueous hydrochloric acid solution of 4 g. of palladium chloride, an aqueous solution of 8.4 g. of calcium chloride, and 100 ml. of silica gel were admixed, and the mixture was vaporized to dryness on a water bath to prepare a catalyst.

12 ml. of this catalyst was mixed with 12 ml. of quartz sand. The mixture was filled into a reaction tube having an outer diameter of 12 mm., and was maintained in a nitre bath kept at 300° C. To the reaction tube, a mixed gas comprising ethylene, hydrogen cyanide, oxygen, hydrogen chloride and nitrogen in a volume ratio of 3:3:2:6:6 was fed at a flow rate of 160 ml./mm.

After 1 hour from the initiation of the reaction, 81% of the fed ethylene was converted and acrylonitrile was formed in a yield of 87 mol percent based on the converted ethylene. Even after 6 hours from the initiation of the reaction, acrylonitrile was obtained in substantially the same yield.

EXAMPLE 4

A mixture comprising an aqueous solution of hydrogen chloride of 10 g. of palladium chloride, an aqueous solution of 3 g. of sodium chloride and 3 g. of cadmium chloride, and 100 ml. of silica gel was vaporized to dryness on a water bath to prepare a catalyst.

4 ml. of this catalyst was filled into a reaction tube having an outer diameter of 12 mm., and was kept at 270° C. To the reaction tube, a mixed gas comprising ethylene, hydrogen cyanide, oxygen, hydrogen chloride and nitrogen in a volume ratio of 15:12:10:20:43 was fed at a flow rate of 100 ml./mm.

The yield of acrylonitrile was 41 mol percent based on the fed ethylene, both after 1 hour and 6 hours from the initiation of the reaction.

EXAMPLE 5

An aqueous hydrochloric acid solution of 10 g. of palladium chloride and an aqueous solution of 8.4 g. of cesium chloride were added to 100 ml. of silica gel, and the mixture was vaporized to dryness with stirring on a water bath to prepare a catalyst.

8 ml. of this catalyst was mixed with 12 ml. of quartz sand and was filled into a reaction tube having an outer diameter of 12 mm., and the tube was maintained in a nitre bath kept at 330° C. To the reaction tube, a mixed gas comprising ethylene, hydrogen cyanide, oxygen, hydrogen chloride and nitrogen in a volume ratio of 3:2:1:6:8 was fed at a flow rate of 200 ml./min.

The yield of acrylonitrile was 34 mol percent both after 30 minutes and after 6 hours from the initiation of the reaction. In addition, 0.7 mol percent based on the fed ethylene of vinyl chloride was by-produced. The by-production of propionitrile, acetonitrile and ethyl chloride was not observed except in slight amounts immediately after initiation of the reaction.

EXAMPLE 6

A catalyst was prepared in the same manner as in Example 3 from an aqueous hydrochloric acid solution of 10 g. of palladium chloride, an aqueous solution of 5 g. of rubidium hydroxide, and 100 ml. of silica gel. Using this catalyst, a reaction was effected under the same conditions as in Example 3.

The yield of acrylonitrile was 27 mol percent based on the fed ethylene both after 30 minutes and after 6 hours from the initiation of the reaction. In addition thereto, 0.2 mol percent of propionitrile was by-produced.

EXAMPLE 7

Using a catalyst prepared in the same manner as in Example 3 from 2 g. of lithium chloride, 10 g. of palladium chloride and 100 ml. of silica gel, a reaction was effected under the same conditions as in Example 3.

The yield of acrylonitrile was 24 mol percent based on the fed ethylene both after 20 minutes and after 6 hours from the initiation of the reaction. In addition thereto, 0.14 mol percent of propionitrile was by-produced.

EXAMPLE 8

Using a catalyst prepared in the same manner as in Example 3 from 3 g. of sodium chloride, 10 g. of palladium chloride and 100 ml. of silica gel, a reaction was effected under the same conditions as in Example 3.

The yield of acrylonitrile was 22 mol percent based on the fed ethylene after 30 minutes from the initiation of reaction and was 20 mol percent after 3 hours. In addition thereto, propionitrile was by-produced in amounts of 0.6 mol percent and 0.4 mol percent, respectively, and ethyl chloride was by-produced in slight amounts.

EXAMPLE 9

Using a catalyst prepared in the same manner as in Example 3 from an aqueous solution of 9 g. of potassium sulphate, an aqueous hydrochloric acid solution of 10 g. of palladium chloride and 100 ml. of silica gel, a reaction was effected under the same conditions as in Example 3.

The yield of acrylonitrile was 36 mol percent based on the fed ethylene after 30 minutes from the initiation of reaction and was 41 mol percent after 3 hours.

EXAMPLE 10

Using a catalyst prepared in the same manner as in Example 3 from an aqueous solution of 10 g. of magnesium chloride, an aqueous hydrochloric acid solution of 10 g. of palladium chloride, and 100 ml. of silica gel, a reaction was effected under the same conditions as in Example 3.

The yield of acrylonitrile was 11.3 mol percent based on the fed ethylene after 30 minutes from the initiation of reaction and was 9.4 mol percent after 3 hours. In addition thereto, 0.3 mol percent of propionitrile and a slight amount of vinyl chloride were by-produced.

EXAMPLE 11

Using a catalyst prepared in the same manner as in Example 3 from an aqueous solution of 7 g. of calcium chloride, an aqueous hydrochloric acid solution of 10 g. of palladium chloride and 100 ml. of silica gel, a reaction was effected under the same conditions as in Example 3.

The yield of acrylonitrile was 17 mol percent based on the fed ethylene both after 30 minutes and after 3 hours from the initiation of reaction. In addition thereto, 0.15 mol percent of propionitrile and 0.1 mol percent of ethyl chloride were by-produced.

EXAMPLE 12

Using a catalyst prepared in the same manner as in Example 3 from an aqueous solution of 12 g. of barium chloride, an aqueous hydrochloric acid solution of 10 g. of palladium chloride and 100 ml. of silica gel, a reaction was effected under the same conditions as in Example 3.

The yield of acrylonitrile was 12 mol percent both after 1 hour and 3 hours from the initiation of reaction. In addition thereto, 1 mol percent of propionitrile, 1 mol percent of vinyl chloride and 0.1 mol percent of ethyl chloride were by-produced.

EXAMPLE 13

Using a catalyst prepared in the same manner as in Example 3 from an aqueous solution of 13 g. of strontium chloride, an aqueous hydrochloric acid solution of 10 g. of palladium chloride, and 100 ml. of silica gel, a reaction was effected under the same conditions as in Example 3.

The yield of acrylonitrile was 14.5 mol percent based on the fed ethylene after 30 minutes from the initiation of reaction, and was 11.3 mol percent after 3 hours. In addition thereto, 0.1 mol percent of propionitrile was by-produced.

EXAMPLE 14

Using a catalyst prepared from an aqueous solution of 7 g. of zinc chloride, an aqueous hydrochloric acid solution of 10 g. of palladium chloride, and 100 ml. of silica gel, a reaction was effected under the same conditions as in Example 3.

The yield of acrylonitrile was 7.2 mol percent based on the fed ethylene after 30 minutes from the initiation of reaction, 12 mol percent after 2 hours, and 12 mol percent after 6 hours. In addition thereto, 0.6 mol percent of ethyl chloride and slight amounts of propionitrile, acetonitrile and vinyl chloride were by-produced after 4 hours from the initiation of reaction.

EXAMPLE 15

Using a catalyst prepared from an aqueous solution of 11 g. of indium chloride, an aqueous hydrochloric acid solution of 10 g. of palladium chloride and 100 ml. of silica gel, a reaction was effected under the same conditions as in Example 3.

The yield of acrylonitrile was 10.7 mol percent based on the fed ethylene both after 30 minutes and after 6 hours. As a by-product, acetonitrile in a slight amount was observed at the initial stage of reaction.

EXAMPLE 16

Using a catalyst prepared in the same manner as in Example 3 from an aqueous solution of 8 g. of copper chloride, an aqueous hydrochloric acid solution of 10 g. of palladium chloride and 100 ml. of silica gel, a reaction was effected under the same conditions as in Example 3.

The yield of acrylonitrile was 20, 20, and 15 mol percent based on the fed ethylene after 30 minutes, 90 minutes and 150 minutes, respectively, from the initiation of reaction. In addition thereto, 0.1 mol percent of ethyl chloride and 0.2 mol percent of acetonitrile were by-produced.

EXAMPLE 17

Using a catalyst prepared in the same manner as in Example 3 from an aqueous solution of 19 g. of cerium chloride, an aqueous hydrochloric acid solution of 10 g. of palladium chloride and 100 ml. of silica gel, a reaction was effected under the same conditions as in Example 3.

The yield of acrylonitrile was, based on ethylene supplied, 13, 20, 20 and 14 mol percent, respectively, at 30 minutes, one hour, 2 hours and 3 hours after initiation of reaction. Other than the above, 0.6 mol percent of propionitrile and 0.1 mol percent of ethyl chloride, were produced together with 0.3 mol percent and 0.1 mol percent of vinyl chloride, respectively at 2 hours and 3 hours after initiation of reaction.

EXAMPLE 18

Using a catalyst prepared in the same manner as in Example 3 from an aqueous solution of 12 g. of thallium chloride, an aqueous hydrochloric acid solution of 10 g. of palladium chloride, and 100 ml. of silica gel, a reaction was effected under the same conditions as in Example 3.

The yield of acrylonitrile was 20, 15 and 12 mol percent after 1, 2 and 4 hours, respectively, from the initiation of reaction. In addition thereto, 1.3 mol percent of vinyl chloride was by-produced.

EXAMPLE 19

Using a catalyst prepared in the same manner as in Example 3 from an aqueous hydrochloric acid solution of 17 g. of bismuth chloride, an aqueous hydrochloric acid solution of 10 g. of palladium chloride and 100 ml. of silica gel, a reaction was effected in the same manner as in Example 3.

The yield of acrylonitrile was 27 and 14 mol percent based on the fed ethylene after 30 minutes and 3 hours, respectively, from the initiation of reaction. In addition thereto, vinyl chloride was by-produced in 0.3 mol percent and a slight amount after 30 minutes and 3 hours, respectively.

EXAMPLE 20

Using a catalyst prepared in the same manner as in Example 3 from an aqueous hydrochloric acid solution of 11 g. of antimony chloride, an aqueous hydrochloric acid solution of 10 g. of palladium chloride and 100 ml. of silica gel, a reaction was effected under the same conditions as in Example 3.

The yield of acrylonitrile was 17 and 9 mol percent based on the fed ethylene after 30 minutes and 2 hours, respectively, from the initiation of reaction. In addition thereto, vinyl chloride was by-produced in 14 and 8 mol percent after 30 minutes and 2 hours, respectively, from the initiation of reaction.

EXAMPLE 21

Using a catalyst prepared in the same manner as in Example 3 from an aqueous solution of 12 g. of thallium chloride and 3 g. of sodium chloride, an aqueous hydrochloric acid solution of 10 g. of palladium chloride and 100 ml. of silica gel, a reaction was effected under the same conditions as in Example 3.

The yield of acrylonitrile was 23.2 and 21.7 mol percent based on the fed ethylene after 30 minutes and 2 hours, respectively, from the initiation of reaction.

EXAMPLE 22

Using a catalyst prepared in the same manner as in Example 3 from an aqueous hydrochloric acid solution of 17 g. of bismuth chloride, and aqueous solution of 3 g. of sodium chloride, an aqueous hydrochloric acid solution of 10 g. of palladium chloride and 100 ml. of silica gel, a reaction was effected under the same conditions as in Example 3.

The yield of acrylonitrile was 34, 23 and 19 mol percent based on the fed ethylene after 30 minutes, 90 minutes and 3 hours, respectively, from the initiation of reaction.

EXAMPLE 23

Using a catalyst prepared in the same manner as in Example 3 from an aqueous solution of 11 g. of cadmium chloride, an aqueous hydrochloric acid solution of 17 g. of bismuth chloride, an aqueous hydrochloric acid solution of 10 g. of palladium chloride and 100 ml. of silica gel, a reaction was effected under the same condition as in Example 3.

The yield of acrylonitrile was 25 and 14 mol percent based on the fed ethylene after 30 minutes and 3 hours, respectively, from the initiation of reaction. In addition thereto, 0.7 mol percent of vinyl chloride and a slight amount of ethyl chloride were by-produced.

EXAMPLE 24

Using a catalyst prepared in the same manner as in Example 3 from an aqueous solution of 11 g. of cadmium chloride, an aqueous solution of 12 g. of thallium chloride, an aqueous solution of 3 g. of sodium chloride, an aqueous hydrochloric acid solution of 10 g. of palladium chloride, and 100 ml. of silica gel, a reaction was effected under the same conditions as in Example 3.

The yield of acrylonitrile was 32 mol percent based on the fed ethylene both after 30 minutes and 4 hours from the initiation of reaction.

EXAMPLE 25

Using a catalyst prepared in the same manner as in Example 3 from an aqueous solution of 4 g. of potassium chloride, an aqueous hydrochloric acid solution of 10 g. of palladium chloride, and 100 ml. of silica gel, a reaction was effected under the same conditions as in Example 3.

The yield of acrylonitrile was 32 and 27 mol percent based on the fed ethylene after 30 minutes and 3 hours, respectively, from the initiation of reaction.

EXAMPLE 26

An aqueous hydrochloric acid solution of 10 g. of palladium chloride, an aqueous solution of 8.4 g. of cesium chloride, and 100 ml. of silica gel were admixed, and the mixture was vaporized to dryness on a water bath to prepare a catalyst.

4 ml. of this catalyst was filled into a reaction tube having an outer diameter of 12 mm. and was maintained at 300° C. To the reaction tube, a mixed gas comprising ethylene, hydrogen cyanide, oxygen, hydrogen chloride and nitrogen in a volume ratio of 15:15:7:3:60 was fed at a flow rate of 150 ml./min.

The yield of acrylonitrile was 20, 15 and 15 mol percent based on the fed ethylene after 30 minutes, 1 hour and 6 hours, respectively, from the initiation of reaction. In addition thereto 0.6 mol percent of propionitrile was by-produced.

EXAMPLE 27

100 ml. of silica gel was charged into an aqueous hydrochloric acid solution of 4 g. of palladium chloride, and the mixture was vaporized to dryness on a water bath. The dried substance was maintained at 200° C. and was treated in a stream of hydrogen gas for 3 hours to reduce the palladium chloride to palladium. The treated substance was charged into an aqueous solution containing 10 g. of strontium chloride, and the mixture was vaporized to dryness on a water bath to prepare a catalyst.

8 ml. of this catalyst was filled into a reaction tube having an outer diameter of 12 mm. and was maintained at 300° C. To the reaction tube, a mixed gas comprising ethylene, hydrogen cyanide, oxygen, hydrogen chloride and nitrogen in a volume ratio of 3:3:1:8:6 was fed at a flow rate of 200 ml./min.

The yield of acrylonitrile was 14 and 11 mol percent after 30 minutes and 3 hours, respectively, from the initiation of reaction.

EXAMPLE 28

100 ml. of silica gel was charged into an aqueous hydrochloric acid solution of 4 g. of palladium chloride, and the mixture was vaporized to dryness over a water bath and was then maintained at 200° C. The dried substance was treated in a stream of hydrogen gas for 3 hours to reduce the palladium chloride to palladium. The treated substance was charged into an aqueous hydrochloric acid solution containing 11 g. of cadmium chloride, 12 g. of thallium chloride and 3 g. of sodium chloride, and the mixture was vaporized to dryness over a water bath to prepare a catalyst.

8 ml. of this catalyst was filled into a reaction tube having an outer diameter of 12 mm. To the reaction tube, a mixed gas comprising ethylene, hydrogen cyanide, hydrochloric acid and nitrogen in a volume ratio of 3:3:1:8:6 was fed at a flow rate of 200 ml./min.

The yield of acrylonitrile was 30 mol percent based on the fed ethylene both after 30 minutes and 3 hours from the initiation of reaction.

EXAMPLE 29

12 ml. of a catalyst prepared from an aqueous hydrochloric acid solution of 10 g. of palladium chloride, aqueous solutions of 11 g. of cadmium chloride and 3 g. of sodium chloride, and 100 ml. of silica gel was packed in a reaction tube having an outer diameter of 12 mm. and was maintained at 350° C. To the reaction tube, a mixed gas comprising propylene, hydrogen cyanide, oxygen, hydrogen chloride and nitrogen in a volume ratio of 2:1:1:6:18 was fed at a flow rate of 100 ml./min.

The yields of methacrylonitrile and crotononitrile were 15 and 16 mol percent, respectively, both after 30 minutes and 3 hours from the initiation of reaction.

EXAMPLE 30

15 ml. of a catalyst prepared from an aqueous hydrochloric acid solution of 10 g. of palladium chloride, an aqueous solution of 12 g. of thallium chloride, and 100 ml. of silica gel was packed into a reaction tube having an outer diameter of 12 mm. and was maintained at 350° C. To the reaction tube, a mixed gas comprising propylene, hydrogen cyanide, oxygen, hydrogen chloride and nitrogen in a volume ratio of 3:2:1:4:10 was fed at a flow rate of 150 ml./min.

The yields of methacrylonitrile and crotononitrile were 17 and 18 mol percent, respectively, based on the fed propylene after 1 hour from the initiation of reaction, and 12 and 13 mol percent after 3 hours.

EXAMPLE 31

To 100 ml. of silica gel were added an aqueous hydrochloric acid solution of 10 g. of palladium chloride and an aqueous solution of 5 g. of rubidium hydroxide, and the mixture was vaporized to dryness with stirring over a water bath to prepare a catalyst.

10 ml. of this catalyst was packed into a reaction tube having an outer diameter of 12 mm. and was maintained at 370° C. To the reaction tube, a mixed gas comprising propylene, propane, hydrogen cyanide, oxygen, hydrogen chloride and nitrogen in a volume ratio of 2:1:2:1:6:19 was fed at a flow rate of 200 ml./min.

The yields of methacrylonitrile and crotononitrile were 11 and 8 mol percent, respectively, based on the fed propylene both after 30 minutes and 2 hours from the initiation of reaction.

EXAMPLE 32

To 100 ml. of active alumina were added and an aqueous hydrochloric acid solution of 10 g. of palladium chloride and an aqueous solution of 4 g. of lithium chloride, and mixture was vaporized to dryness with stirring over a water bath to prepare a catalyst.

10 ml. of this catalyst was mixed with 10 ml. of quartz sand, and the mixture was packed into a reaction tube having an outer diameter of 12 mm. and was maintained at 350° C. To the reaction tube, a mixed gas comprising ethylene, hydrogen cyanide, oxygen, hydrogen chloride and nitrogen in a volume ratio of 3:2:1:6:18 was fed at a flow rate of 200 ml./min.

The yield of acrylonitrile was 27 mol percent based on the fed ethylene after 30 minutes from the initiation of reaction and was 25 mol percent after 3 hours. In addition thereto, 1.2–0.8 mol percent of propionitrile was by-produced.

EXAMPLES 33–66

The results of reactions carried out under various conditions, using 34 different catalysts prepared from palladium cyanide and potassium cyanide are shown in Table 3.

| Ex. No. | Catalyst (each numeral in parenthesis is the amount employed; g. per 100 ml. of carrier) | Carrier | Temperature (°C.) | Space velocity (hr.$^{-1}$) | Inlet gases (volume ratio) | | | | | | Yield of acrylonitrile (mol percent based on fed ethylene) | |
|---|---|---|---|---|---|---|---|---|---|---|---|---|
| | | | | | Ethylene | Hydrogen cyanide | Oxygen | Hydrogen chloride | Nitrogen | Other gas | 30 minutes after initiation of reaction | 3 hours after initiation of reaction |
| 33 | Palladium cyanide (3.2) / Potassium cyanide (3.2) | Silica gel | 330 | 1,500 | 15 | 10 | 5 | 40 | 30 | | 32 | 29 |
| 34 | Palladium chloride (5.3) / Calcium cyanide (4.5) | ---do---- | 400 | 1,100 | 15 | 10 | 5 | 20 | 40 | [1] 10 | 21 | 21 |
| 35 | Palladium (2) / Sodium chloride (3) | ---do---- | 300 | 1,000 | 15 | 10 | 8 | 30 | 35 | [2] 2 | 24 | 22 |
| 36 | Palladium sulphate (4) / Potassium sulphate (6) | ---do---- | 350 | 1,000 | 15 | 10 | 5 | 30 | 40 | | 42 | 41 |
| 37 | Palladium chloride (4) / Potassium dihydrogen phosphate (7) | Active carbon | 330 | 1,500 | 15 | 10 | 5 | 40 | 30 | | 31 | 30 |
| 38 | Palladium acetate (2.5) / Potassium acetate (5) | Silica gel | 330 | 1,500 | 15 | 10 | 5 | 40 | 30 | | 35 | 33 |
| 39 | Palladium nitrate (4.5) / Potassium nitrate (5) | ---do---- | 300 | 800 | 15 | 10 | 8 | 30 | [3] 7 | 30 | 32 | 31 |
| 40 | Palladium nitrate (5) / Potassium carbonate (5) | Active carbon | 300 | 900 | 15 | 10 | 5 | 30 | 35 | [4] 5 | 43 | 38 |
| 41 | Palladium chloride (4) / Sodium borate (4) | Silica | 350 | 1,500 | 15 | 10 | 5 | 35 | 35 | | 20 | 19 |
| 42 | Palladium chloride (1.5) / Barium iodide (13) | ---do---- | 300 | 800 | 15 | 10 | 8 | 30 | 37 | | 19 | 19 |
| 43 | Palladium chloride (2) / Sodium cyanide (2.5) | ---do---- | 280 | 800 | 15 | 10 | 5 | 40 | 30 | | 23 | 20 |
| 44 | Palladium chloride (10) / Copper bromine (2.2) | ---do---- | 250 | 700 | 15 | 15 | 5 | 5 | 30 | 43 | 17 | 13 |
| 45 | Palladium chloride (3) / Pottassium cyanide (9) | ---do---- | 300 | 1,000 | 15 | 10 | 5 | 40 | 30 | | 37 | 35 |
| 46 | Palladium chloride (5) / Zinc iodide (13) | Active carbon | 315 | 1,000 | 15 | 10 | 5 | 40 | 30 | | | 21 |
| 47 | Palladium hydrox(3)de / Potassium hydroxide (3) | Silica gel | 350 | 2,000 | 15 | 10 | 5 | 40 | 30 | | 32 | 32 |
| 48 | Palladium chloride (2) / Strontium bromide (10) | ---do---- | 350 | 1,500 | 15 | 10 | 5 | 40 | 30 | | 18 | 16 |
| 49 | Palladium chloride (10) / Magnesium oxide (2) | ---do---- | 300 | 1,500 | 15 | 10 | 5 | 40 | 30 | | 10 | 8.2 |
| 50 | Palladium chloride (5) / Indium sulphate (14) | ---do---- | 330 | 1,100 | 15 | 10 | 8 | 40 | 27 | | 18 | 18 |
| 51 | Palladium chloride (4.2) / Rubidium acetate (7.3) | ---do---- | 300 | 800 | 15 | 10 | 8 | 25 | 42 | | 35 | 35 |
| 52 | Palladium chloride (10) / Cerium acetate (6.4) | ---do---- | 330 | 1,200 | 15 | 10 | 8 | 40 | 27 | | | 24 |
| 53 | Palladium chloride (10) / Bismuth nitrate (8) | ---do---- | 300 | 1,000 | 15 | 10 | 8 | 40 | 27 | | 42 | 23 |
| 54 | Palladium chloride (10) / Antimony oxide (3.4) | ---do---- | 280 | 1,000 | 15 | 10 | 10 | 10 | 25 | | 23 | 14 |
| 55 | Palladium chloride (10) / Cerium hydroxide (1.9) | ---do---- | 350 | 2,300 | 15 | 10 | 5 | 35 | 35 | | | 14 |
| 56 | Palladium chloride (5) / Thallium bromide (2) | ---do---- | 300 | 1,000 | 15 | 10 | 5 | 30 | 40 | | 25 | 17 |
| 57 | Palladium chloride (2) / Cesium bromide (11) | ---do---- | 300 | 900 | 15 | 10 | 10 | 10 | 55 | | 65 | 65 |
| 58 | Palladium chloride (4) / Calcium nitrate (6.5) | ---do---- | 330 | 1,500 | 15 | 10 | 5 | 20 | 50 | | 16 | 15 |
| 59 | Palladium acetate (4.5) / Lithium acetate (4.5) | ---do---- | 345 | 2,000 | 15 | 10 | 5 | 20 | 50 | | 22 | 20 |
| 60 | Palladium chloroacetate (6) / Potassium oxalate (9) | ---do---- | 300 | 1,000 | 15 | 10 | 8 | 35 | 32 | | 40 | 38 |
| 61 | Palladium chloride (2) / Potassium citrate (16) | ---do---- | 300 | 1,200 | 15 | 10 | 5 | 30 | 40 | | 31 | 30 |
| 62 | Palladium bromide (6) / Potassium bromide (6) | Active carbon | 270 | 1,500 | 15 | 10 | 8 | 40 | 27 | | 47 | 45 |
| 63 | Palladium iodide (11) / Potassium iodide (9) | Silica gel | 300 | 1,200 | 15 | 10 | 5 | 20 | 50 | | 25 | 24 |
| 64 | Palladium chloride (4) / Cadmium sulphate (7) / Bismuth chloride (3) / Palladium (1) | ---do---- | 300 | 1,000 | 15 | 10 | 8 | 20 | 47 | | 38 | 31 |
| 65 | Cadmium chloride (6) / Cerium chloride (2.5) / Palladium chloride (2) | Active carbon | 350 | 1,800 | 15 | 10 | 5 | 40 | 30 | | [6] 24 | 19 |
| 66 | Cadmium chloride (3) / Cesium chloride (3.5) | Silica gel | 330 | 1,500 | 15 | 15 | 10 | 5 | 55 | | 20 | 19 |

[1] Carbon dioxide. [2] Carbon monoxide. [3] Water. [4] Ethane. [5] Methane. [6] 60 minutes after initiation of reaction.

EXAMPLE 67

300 ml. of silica gel was charged in an aqueous hydrochloric acid solution containing 0.06 mol of palladium chloride and 0.15 mol of cadmium chloride, and the mixture was vaporized to dryness over a water bath and was then dried to prepare a catalyst.

5 ml. of this catalyst was maintained at 335° C., and a mixed gas comprising ethylene, hydrogen cyanide, hydrogen chloride, oxygen and nitrogen in a volume ratio of 15:5:10:8:70 was fed at a space velocity at 1200 hr.$^{-1}$. After 6 hours from the initiation of reaction, acrylonitrile was obtained in a yield of 71 mol percent based on the fed hydrogen cyanide. In this case, no formation of propionitrile was observed.

EXAMPLE 68

Using a palladium cyanide-cadmium cyanide-active carbon catalyst (containing per litre of active carbon 0.2 mol of palladium cyanide and 2 moles of cadmium cyanide), a starting gas comprising, by volume, 42% of ethylene, 7% of hydrogen cyanide, 14% of hydrogen chloride, 10% of methane, 7% of oxygen and 20% of nitrogen was reacted at a temperature of 300° C. and at a space velocity of 320 hr.$^{-1}$, whereby acrylonitrile was obtained in a yield of 23 mol percent based on the fed hydrogen cyanide. The amount of propionitrile formed was less than 0.1 mol percent.

EXAMPLE 69

Using a palladium chloride-cadmium chloride-silica gel catalyst (containing per litre of silica gel 0.3 mol of palladium chloride and 0.5 mol of cadmium chloride), a starting gas comprising, by volume, 30% of propylene, 10% of hydrogen cyanide, 10% of hydrogen chloride, 6% of oxygen and 4% of nitrogen was reacted at a temperature of 330° C. and at a space velocity of 410 hr.$^{-1}$, to obtain methacrylonitrile and crotononitrile in yields of 14 mol percent and 15 mol percent, respectively, based on the fed hydrogen cyanide. The amounts of normal and isobutyronitrile formed were slight.

EXAMPLES 70–76

Using various catalysts prepared according to an immersion method, reactions were effected in the same reaction tube as used in Example 1, to obtain the results set forth in Table 4. In practicing the process of the present invention, a gradual diminution of catalyst activity is observed with the lapse of time. In such a case, the feeding of starting gas is discontinued and the catalyst is heated while introducing oxygen or a molecular oxygen-containing gas (e.g. air), as a result of which the catalyst activity is readily restored.

EXAMPLE 79

Silica gel was charged into an aqueous hydrochloric acid solution of 6.7 g. of rhodium chloride, and the mixture was dried over a water bath to prepare a catalyst. 10 ml. of this catalyst was maintained at 400° C. and a mixed gas comprising ethylene, hydrogen cyanide, air and hydrogen chloride in a volume ratio of 6:2:5:0.4 was fed at a space velocity of 1080 hr.$^{-1}$. After 1 hour from the initiation of reaction, acrylonitrile was obtained in a yield of 17% based on the fed hydrogen cyanide and vinyl chloride was produced in a yield of 3% based on the fed hydrogen chloride.

EXAMPLE 80

The rhodium chloride-silica gel catalyst prepared in Example 3 was heated to 350° C. in a stream of hydrogen gas to reduce the rhodium chloride to rhodium metal. 20 ml. of the thus treated catalyst was maintained at 300° C., and a mixed gas comprising propylene, hydrogen cyanide,

TABLE 4

| Ex. No. | Kind and amount (mol/l.) of catalyst | Carrier | Temperature (° C.) | Space velocity [1] (hr.$^{-1}$) | Feed gas composition (volume percent) | | | | Other component (volume percent) | Yield of acrylonitrile [2] (mol percent) |
|---|---|---|---|---|---|---|---|---|---|---|
| | | | | | $C_2H_4$ | HCN | HCl | $O_2$ | | |
| 70 | Palladium chloride (0.5) / Cadmium chloride (0.5) | Silica gel | 330 | 1,500 | 16 | 10 | 10 | 16 | $N_2$ (48) | 65 |
| 71 | Palladium sulphate (1) / Cadmium sulphate (0.2) | Alumina boria | 430 | 4,200 | 28 | 19 | 19 | 9 | $N_2$(20) plus $H_2O$ (5) | 2.1 |
| 72 | Palladium acetate (0.2) / Cadmium acetate (0.5) | Molecular sieve | 330 | 1,250 | 27 | 9 | 9 | 5 | $N_2$(50) | 9 |
| 73 | Palladium monochloroacetate (0.2) / Cadmium oxalate (—) | Silica gel | 300 | 1,220 | 30 | 5 | 29 | 6 | $N_2$(30) | 7.5 |
| 74 | Palladium chloride (0.2) / Cadmium chloride (0.5) | do | 325 | 750 | 30 | 10 | 10 | 6 | $N_2$(22) plus CO (22) | 45 |
| 75 | Palladium chloride (0.3) / Rhodium chloride (0.2) / Cadmium chloride (0.5) | Active carbon | 315 | 700 | 28 | 19 | 9 | 6 | $N_2$(41) | 37 |
| 76 | Rhodium chloride (0.5) / Cadmium chloride (0.5) | Silica gel | 330 | 1,500 | 18 | 2.5 | 10 | 5 | $N_2$(87.5) | 83 |

[1] Flow rate of feed gas (normal state)/volume of catalyst.
[2] Based on fed hydrogen cyanide.

EXAMPLE 77

A palladium chloride-silica gel catalyst was maintained at 300° C., and a mixed gas comprising ethylene, hydrogen cyanide, hydrogen chloride, oxygen and nitrogen in a volume ratio of 30:5:10:3:24 was fed at a space velocity of 240 hr.$^{-1}$. The yield of acrylonitrile based on the fed hydrogen cyanide was 36, 46 and 24 mol percent after 30 minutes, 2 hours and 20 hours, respectively, from the initiation of reaction.

COMPARATIVE EXAMPLE

The same catalyst as in Example 77 was maintained at 300° C., and the same starting gas as in Example 77, except that hydrogen chloride had been excluded therefrom (i.e. a mixed gas comprising ethylene, hydrogen cyanide, oxygen and nitrogen in a volume ratio of 30:5:3:24) was fed at a space velocity of 210 hr.$^{-1}$. the yield of acrylonitrile based on the fed hydrogen cyanide was 20 mol percent after 30 minutes from the initiation of reaction, was 7 mol percent after 2 hours and was substantially 0 mol percent after 20 hours.

EXAMPLE 78

100 ml. of granular active carbon was charged into an aqueous hydrochloric acid solution of 8.4 g. of palladium chloride, and the mixture was dried over a water bath to prepare a catalyst. 5 ml. of this catalyst was maintained at 350° C., and a mixed gas comprising ethylene, hydrogen cyanide, air and hydrogen chloride in a volume ratio of 6:1:6:2 at a space velocity of 1210 hr.$^{-1}$. After 1 hour from the initiation of reaction, acrylonitrile was obtained in a yield of 85% based on the fed hydrogen cyanide, and propionitrile was by-produced in a yield of 1%.

air and hydrogen chloride in a volume ratio of 6:1:3:2 (the propylene contained 20% of propane, 5% of carbon dioxide and 2% of methane) was fed at a space velocity of 1200 hr.$^{-1}$. After 1 hour from the initiation of reaction, methacrylonitrile and crotononitrile were obtained in yields of 27 and 13%, respectively, based on the fed hydrogen cyanide.

EXAMPLE 81

5.3 g. of palladium cyanide was dissolved in ammonia water. Into the solution, 100 ml. of silica-alumina containing 5% of alumina was charged, and the mixture was dried over a water bath, was further subjected overnight to vacuum drying at 110° C. and was freed from ammonia, to prepare a catalyst. 20 ml. of this catalyst was maintained at 300° C., and a mixed gas of 100 ml./min. of ethylene, 15 ml./min. of hydrogen cyanide and 60 ml./min. of air was fed together with 0.5 ml./min. of 12 N hydrochloric acid. After 1 hour from the initiation of reaction, acrylonitrile was obtained in a single pass yield of 7% based on the fed hydrogen cyanide, and propionitrile in an amount of 2% was by-produced.

EXAMPLES 82–85

Reactions were effected under the following conditions using catalysts prepared by carrying on granular active carbon each of palladium bromide, palladium sulphate, palladium acetate and rhodium iodide. Results of the reactions are shown in Table 5.

TABLE 5

| Example No. | Catalyst (g./100 ml. active carbon) | Reaction temperature (° C.) | $C_2H_4$/HCN/ HCl/$O_2$/$N_2$ (volume ratio) | Space velocity (hr.$^{-1}$) | One pass yield of acrylonitrile (based on fed HCN) |
|---|---|---|---|---|---|
| 82 | Palladium bromide (5.5 g.) | 300 | 6/1/2/1/5 | 1,080 | 21 |
| 83 | Palladium sulphate (6.0 g.) | 350 | 6/1/2/1/5 | 800 | 38 |
| 84 | Palladium acetate (3.1 g.) | 270 | 6/1/2/1/5 | 720 | 17 |
| 85 | Rhodium iodide (3.4 g.) | 350 | 6/1/2/1/5 | 1,080 | 31 |

Note.—One pass yield acrylonitrile (percent) shows a result after one hour from the initiation of reaction.

EXAMPLES 86–107

Results obtained by use of catalysts comprising palladium chloride in combination with other metal salts are shown in Table 6.

TABLE 6

| Example No. | Catalyst [1] | Yield (percent) [2] of acrylonitrile |
|---|---|---|
| 86 | Palladium chloride (88), chromium chloride (79). | 30 |
| 87 | Palladium chloride (88), ruthenium chloride (103). | 19 |
| 88 | Palladium chloride (88), aluminum chloride (67). | 9 |
| 89 | Palladium chloride (88), vanadium chloride (96). | 13 |
| 90 | Palladium chloride (88), tellurium chloride (100). | 10 |
| 91 | Palladium chloride (88), silver chloride (72). | 20 |
| 92 | Palladium chloride (88), iron chloride (81). | 31 |
| 93 | Palladium chloride (88), lead chloride (139). | 23 |
| 94 | Palladium chloride (88), molybdenum chloride (136). | 26 |
| 95 | Palladium (53), gold. | 7 |
| 96 | Palladium chloride (88), mercury chloride (136). | 12 |
| 97 | Palladium chloride (88), zirconium oxychloride (87). | 18 |
| 98 | Palladium chloride (88), cobalt chloride (65). | 22 |
| 99 | Palladium chloride (88), manganese chloride (63). | 27 |
| 100 | Palladium chloride (88), nickel chloride (65). | 19 |
| 101 | Palladium chloride (88), hudrogen chloroplatinate (260). | 13 |
| 102 | Palladium chloride (88), scandium chloride (76). | 18 |
| 103 | Palladium chloride (88), titanium tetrachloride (95). | 27 |
| 104 | Palladium chloride (88), silicon tetrachloride (85). | 30 |
| 105 | Palladium chloride (85), niobium chloride (135). | 11 |
| 106 | Palladium chloride (88), beryllium chloride (40). | 20 |
| 107 | Palladium chloride (88), germanium chloride (107.) | [3] 15 |

[1] Carred on silica gel, each numeral in parenthesis is the carried amount (g./liter).
[2] Mol percent based on fed hydrogen cyanide.
[3] Vinyl chloride by-produced in addition.

Reaction conditions—
  Temperature: 330° C.
  Space velocity: 1500 hr.$^{-1}$
  Starting material compositioin:
    Eethylene:hydrogen cyanide:oxygen:hydrogen chloride:hitrogen=15:10:5:40:30 (volume ratio)

EXAMPLE 108

88 g. of palladium chloride and 45 g. of phosphoric acid were carried on 1 liter of silica gel to prepare a catalyst. 8 ml. of this catalyst was maintained at 330° C. and a mixed gas comprising ethylene, hydrogen cyanide, oxygen, hydrogen chloride and nitrogen in a volume ratio of 3:2:1:2:12 was fed at a space velocity of 1500 hr.$^{-1}$, whereby acrylonitrile and propionitrile were obtained in yields of 40 and 4 mol percent, respectively, based on the fed hydrogen cyanide.

EXAMPLE 109

Into an aqueous hydrobromic acid solution, 12 g. of palladium chloride and then 100 ml. of silica gel were charged, and the mixture was vaporized to dryness on a water bath to prepare a catalyst. 18 ml. of this catalyst was mixed with 12 ml. of quartz sand, and the mixture was filled into a reaction tube having an outer diameter of 12 mm. and was maintained at 300° C. To the reaction tube, a mixed gas comprising ethylene, hydrogen cyanide, oxygen, hydrogen bromide and nitrogen in a volume ratio of 3:2:2:1:6 was fed at a flow rate of 100 ml./min.

After 1 hour from the initiation of reaction, acrylonitrile was obtained in a yield of 51 mol percent based on the fed hydrogen cyanide, and after 6 hours from the initiation of reaction the same was obtained in a yield of 32 mol percent.

EXAMPLE 110

18 ml. of a palladium bromide-silica gel catalyst prepared in the same manner as in Example 109 was mixed with 12 ml. of quartz sand. The mixture was packed in the same reaction tube as used in Example 109 and was maintained at 300° C. for 3 hours in a stream of hydrogen gas to reduce the palladium bromide to palladium metal. To the reaction tube, a mixed gas comprising ethylene, hydrogen cyanide, oxygen, hydrogen iodide, nitrogen and steam in a volume ratio of 3:2:2:2:6:0.2 was fed at 300° C. and at a flow rate of 100 ml./min.

After 1 hour from the initiation of reaction, acrylonitrile was obtained in a yield of 48 mol percent based on the fed hydrogen cyanide, and after 8 hours, the same was obtained in a yield of 29 mol percent.

EXAMPLE 111

10 g. of palladium chloride and 10 g. of cadmium chloride were charged into an aqueous hydrochloric acid solution, and 100 ml. of silica gel was then added thereto. The mixture was vaporized to dryness on a water bath to prepare a catalyst. 15 ml. of this catalyst was mixed with 12 ml. of quartz sand and the mixture was packed in a reaction tube and was maintained at 330° C. To the reaction tube, a mixed gas comprising ethylene, hydrogen cyanide, oxygen hydrogen bromide and nitrogen in a volume ratio of 3:2:1:1:8 was fed at a flow rate of 100 ml./min. After 1 hour from the initiation of reaction, acrylonitrile was obtained in a yield of 71 mol percent based on the fed hydrogen cyanide. Even after 58 hours, acrylonitrile was obtained in a yield of 71 mol percent.

EXAMPLE 112

7.2 g. of palladium iodide was charged into an aqueous solution of 8.3 g. of potassium iodide, and then 100 ml. of silica gel was added thereto. The mixture was vaporized to dryness on a water bath to prepare a catalyst. 8 ml. of this catalyst was mixed with 12 ml. of quartz sand, and the mixture was packed in a reaction tube and was maintained at 340° C. To the reaction tube, a mixed gas comprising ethylene, hydrogen cyanide, oxygen, hydrogen iodide and nitrogen in a volume ratio of 3:2:2:1:8 was fed at a flow rate of 100 ml./min.

After 1 hour from the initiation of reaction, acrylonitrile was obtained in a yield of 78 mol percent based on the fed hydrogen cyanide, and after 6 hours, the same was obtained in a yield of 78 mol percent.

EXAMPLE 113

3 g. of palladium acetate and 8.4 g. of cesium chloride were carried on 100 ml. of silica gel.

8 ml. of the thus prepared catalyst was maintained at 300° C., and a mixed gas comprising ethylene, hydrogen cyanide, oxygen, hydrogen bromide, nitrogen and carbon dioxide in a volume ratio of 4:2:1:4:9:2 was fed at a space velocity of 800 hr.$^{-1}$, whereby acrylonitrile was obtained in a yield of 35 mol percent based on the fed hydrogen cyanide.

EXAMPLE 114

8 ml. of a catalyst prepared by carrying 8.8 g. of palladium chloride and 6 g. of potassium bromide on 100 ml. of silica gel was maintained at 330° C., and a mixed gas comprising ethylene, hydrogen cyanide, oxygen, hydrogen chloride, hydrogen bromide and nitrogen in a volume ratio of 15:10:5:38:2:30 was fed at a space velocity of 1500 hr.$^{-1}$, whereby acrylonitrile was obtained in a yield of 60 mol percent based on the fed hydrogen cyanide.

EXAMPLE 115

20 ml. of a catalyst prepared by carrying 3.4 g. of palladium chloride on 100 ml. of silica gel was maintained at 300° C., and a mixed gas comprising ethylene, hydrogen cyanide, oxygen, hydrogen chloride and nitrogen in a volume ratio of 30:5:3:10:12 was fed at a space velocity of 240 hr.$^{-1}$. The yield of acrylonitrile based on the fed hydrogen cyanide was 46 mol percent after 1 hour from the initiation of reaction and was 24 mol percent after 21 hours. After 21 hours from the initiation of reaction, the feeding of the mixed gas was discontinued and the catalyst was treated at 330° C. for 3 hours while introducing air (15 ml./min.) and hydrogen chloride (10 ml./min.). Thereafter, the reaction was again effected under the same conditions as above. After 1 hour from the initiation of this reaction, acrylonitrile was obtained in a yield of 46 mol percent based on the fed hydrogen cyanide.

EXAMPLE 116

The reaction of Example 115 was repeated using the same catalyst as in said example. After 1 hour from the initiation of reaction, acrylonitrile was obtained in a yield of 46 mol percent based on the fed hydrogen cyanide and, after 10 hours, in a yield of 38 mol percent. At this moment, the feeding of the mixed gas was discontinued, and the catalyst was treated at 330° C. for 1 hour in an air current. Thereafter, the reaction was again conducted under the same conditions as above. After 1 hour from the initiation of this reaction, acrylonitrile was obtained in a yield of 46 mol percent based on the fed hydrogen cyanide.

EXAMPLE 117

12 ml. of a catalyst prepared by carrying on silica gel 2.2 g. of palladium chloride, 1.7 g. of cesium chloride and 0.7 g. of potassium was maintained at 330° C., and a mixed gas comprising ethylene, hydrogen cyanide, oxygen, hydrogen chloride and nitrogen in a volume ratio of 50:5:5:5:35 was fed at a space velocity of 500 hr.$^{-1}$, whereby acrylonitrile was obtained in a yield of 88 mol percent based on the fed hydrogen cyanide.

Using the same catalyst as above, a mixed gas comprising ethylene, hydrogen cyanide, oxygen, hydrogen chloride and nitrogen in a volume ratio of 50:5:5:2:38 was fed at 330° C. and at a space velocity of 750 hr.$^{-1}$, whereby acrylonitrile was obtained in a yield of 80 mol percent based on the fed hydrogen cyanide.

EXAMPLES 118–121

Results obtained with the use of catalysts comprising palladium chloride in combination with other metal salts are shown in Table 7.

TABLE 7

| Example No. | Catalyst [1] | Yield (percent)[2] of acrylonitrile |
|---|---|---|
| 118 | PdCl$_2$ (17.7), CdCl$_2$ (18.4), CrCl$_3$ (8) | 29 |
| 119 | PdCl$_2$ (17.7), CdCl$_2$ (18.4), MoCl$_4$ (12) | 22 |
| 120 | PdCl$_2$ (17.7), CdCl$_2$ (18.4), MnCl$_2$ (6) | 22 |
| 121 | PdCl$_2$ (17.7), CdCl$_2$ (18.4), FeCl$_3$ (8) | 35 |

[1] Supported on silica gel, each numeral in parenthesis is the supported amount (g./liter).
[2] Mol percent based on fed hydrogen cyanide.

Reaction conditions—
  Temperature: 330° C.
  Space velocity: 12000 hr.$^{-1}$
  Starting material composition, by volume:
    Ethylene: hydrogen cyanide:oxygen:hydrogen chloride:nitrogen=50:0:0:0:35

EXAMPLE 122

An aqueous hydrochloric acid solution containing 2 g. of palladium chloride and an aqueous solution containing 8.4 g. of cesium chloride were mixed together with 100 ml. of silica gel, and the mixture was vaporized to dryness over a water bath to prepare a catalyst. 4 ml. of this catalyst was mixed with 4 ml. of quartz sand, and the mixture was filled in a hard glass reaction tube having an inner diameter of 10 mm. The reaction tube was maintained in a nitre bath kept at 300° C., and a mixed gas comprising normal butylene, hydrogen, cyanide, oxygen, hydrogen bromide and nitrogen in a volume ratio of 4:2:2:1:10 was fed at a flow rate of 50 ml./min. The yields of the resulting α,β-dimethylacrylonitrile and ethylacrylonitrile was 32.0% and 60.4%, respectively, based on the fed hydrogen cyanide.

EXAMPLE 123

An aqueous hydrochloric acid solution containing 1.8 g. of palladium chloride and an aqueous solution containing 0.9 g. of cadmium chloride and 2.9 g. of sodium chloride were mixed together with 100 ml. of silica gel, and the mixture was vaporized to dryness over a water bath to prepare a catalyst. 8 ml. of this catalyst was mixed with 8 ml. of quartz sand, and the mixture was filled in a hard glass reaction tube having an inner diameter of 12 mm. and was maintained at 250° C. To the reaction tube, a mixed gas comprising normal butylene, hydrogen cyanide, oxygen, hydrogen iodide and nitrogen in a volume ratio of 1:1:1:1:1 was fed at a flow rate of 100 ml./min. The yields of the resulting α,β-dimethylacrylonitrile and ethyl-acrylonitrile were 7.8% and 25.8%, respectively, based on the fed hydrogen cyanide after 1 hour from the initiation of reaction and were substantially the same even after 5 hours.

EXAMPLE 124

An aqueous hydrochloric acid solution containing 1.8 g. of palladium chloride was mixed with 100 ml. of silica gel, and the mixture was vaporized to dryness to form palladium chloride-silica gel. This palladium chloride-silica gel was immersed in an aqueous solution containing 3.3 g. of potassium iodide so that it was just soaked with the solution, and was then vaporized to dryness to prepare a catalyst. 12 ml. of this catalyst was mixed with 12 ml. of quartz sand, and the mixture was filled in a hard glass reaction tube having an inner diameter of 10 mm., and was maintained at 300° C. To the reaction tube, a mixed gas comprising isobutylene, hydrogen cyanide, oxygen, hydrogen bromide and nitrogen in a volume ratio of 10:1:1:1:10 was fed at a flow rate of 100 ml./min., whereby β,β-dimethylacrylonitrile was obtained in a yield of 95.1% based on the fed hydrogen cyanide.

EXAMPLE 125

2 ml. of a catalyst prepared by supporting 1.8 g. of palladium chloride, 0.5 g. of zinc chloride and 3.7 g. of potassium chloride on 100 ml. of silica gel was mixed with 2 ml. of quartz sand. The mixture was filled in a reaction tube and was maintained at 350° C. To the reaction tube, a mixed gas comprising isobutylene, hydrogen cyanide, oxygen, hydrogen bromide and nitrogen in a volume ratio of 5:2:2:1:10 was fed at a flow rate of 100 ml./min. After 1 hour from the initiation of reaction, 32.5% of the fed hydrogen cyanide reacted to obtain $\beta,\beta$-dimethylacrylonitrile in a yield of 90.2% based on the reacted hydrogen cyanide. The reaction result was the same even after 10 hours from the initiation of reaction.

EXAMPLE 126

12 ml. of a catalyst prepared by supporting 1.8 g. of palladium chloride, 0.5 g. of zinc chloride and 8.4 g. of cesium chloride on 100 ml. of silica gel was mixed with 12 ml. of quartz sand. The mixture was filled in a hard glass reaction tube having an inner diameter of 22 mm. and was maintained at 360° C. To the reaction tube, a mixed gas comprising ethylene, hydrogen cyanide, oxygen, hydrogen bromide and nitrogen in a volume ratio of 50:4:5:1:40 was fed. After 1 hour from the initiation of reaction, the conversion of hydrogen cyanide was 99.0% and the yield of acrylonitrile was 90.5%. The above reaction results were maintained even after 40 hours from the initiation of reaction.

EXAMPLE 127

8 ml. of a catalyst prepared by supporting 1.8 g. of palladium chloride and 1.7 g. of potassium iodide on 100 ml. of silica gel was mixed with 12 ml. of quartz sand. The mixture was filled in a hard glass reaction tube and was maintained at 260° C. To the reaction tube, a mixed gas comprising propylene, hydrogen cyanide, oxygen, hydrogen bromide and nitrogen in a volume ratio of 7:1:1:1:6 was fed at a flow rate of 80 ml./min. After 30 minutes from the initiation of reaction, methacrylonitrile and crotononitrile were obtained in yields of 29.2% and 27.8% respectively, based on the fed hydrogen cyanide.

EXAMPLE 128

8 ml. of a catalyst prepared by supporting 1.8 g. of palladium chloride and 1.2 g. of potassium bromide on 100 ml. of silica gel was mixed with 12 ml. of quartz sand. The mixture was filled in a reaction tube and was maintained at 280° C. To the reaction tube, a mixed gas comprising propylene, hydrogen cyanide, oxygen, hydrogen bromide and nitrogen in a volume ratio of 7:1:2:1:6 was fed at a flow rate of 80 ml./min. After 30 minutes from the initiation of reaction, methacrylonitrile and crotononitrile were obtained in yields of 37.6% and 48.2%, respectively, based on the fed hydrogen cyanide.

EXAMPLE 129

12 ml. of a catalyst prepared by supporting 1.8 g. of palladium chloride and 1.2 g. of potassium iodide on 100 ml. of silica gel was mixed with 12 ml. of quartz sand. The mixture was filled in a reaction tube and was maintained at 250° C. To the reaction tube, a mixed gas comprising propylene, hydrogen cyanide, oxygen, hydrogen iodide and nitrogen in a volume ratio of 7:1:1:1:6 was fed at a flow rate of 80 ml./min. After 30 minutes from the initiation of reaction, the yields of methacrylonitrile and crotononitrile were 28.5% and 30.2% based on the fed hydrogen cyanide.

EXAMPLE 130

An aqueous hydrochloric acid solution containing 4 g. of palladium chloride, an aqueous solution containing 8.4 g. of cesium chloride and 100 ml. of silica gel were mixed, and the mixture was vaporized to dryness over a water bath to prepare a catalyst. 4 ml. of this catalyst was mixed with 4 ml. of quartz sand, and the mixture was filled in a hard glass reaction tube having an inner diameter of 10 mm. The reaction tube was maintained in a nitre bath kept at 350° C., and a mixed gas comprising normal butylene, hydrogen cyanide, oxygen, hydrogen chloride and nitrogen in a volume ratio of 2:1:1:1:5 was fed at a flow rate of 50 ml./min. After 1 hour from the initiation of reaction, $\alpha,\beta$-dimethylacrylonitrile and ethylacrylonitrile were obtained in yields of 15.1% and 30.6% respectively, based on the fed hydrogen cyanide.

EXAMPLE 131

An aqueous hydrochloric acid solution containing 1.8 g. of palladium chloride and an aqueous solution containing 0.9 g. of cadmium chloride and 2.9 g. of sodium chloride were mixed together with 100 ml. of silica gel, and the mixture was vaporized to dryness over a water bath to prepare a catalyst. 8 ml. of this catalyst was mixed with 8 ml. of quartz sand, and the mixture was filled in a hard glass reaction tube. The reaction tube was maintained in a nitre bath kept at 280° C. and a mixed gas comprising normal butylene, hydrogen cyanide, oxygen hydrogen chloride and nitrogen in a volume ratio of 3:2:1:1:13 was fed at a flow rate of 100 ml./min. After 1 hour from the initiation of reaction, the yields of $\alpha,\beta$-dimethylacrylonitrile and ethylacrylonitrile were 5.2% and 17.2% respectively, based on the fed normal butylene. Even after 10 hours from the initiation of reaction, the yields were substantially the same.

EXAMPLE 132

An aqueous hydrochloric acid solution containing 1.8 g. of palladium chloride was mixed with 100 ml. of silica gel, and the mixture was vaporized to dryness over a water bath to form palladium chloride-silica gel. The palladium chloride-silica gel was then charged in an aqueous solution containing 3.3 g. of potassium iodide so that it was just soaked with said solution, and was then vaporized to dryness over a water bath to prepare a catalyst. 12 ml. of this catalyst was mixed with 12 ml. of quartz sand, and the mixture was filled in a hard glass made reaction tube having an inner diameter of 10 mm., and was then maintained in a nitre bath kept at 300° C. To the reaction tube, a mixed gas comprising isobutylene, hydrogen cyanide, oxygen, hydrogen chloride and nitrogen in a volume ratio of 3:1:1:1:14 was fed at a flow rate of 100 ml./min., whereby 30% of the fed isobutylene reacted to give $\beta,\beta$-dimethylacrylonitrile in 90.3% yield.

EXAMPLE 133

An aqueous hydrochloric acid solution containing 1.8 g. of palladium chloride and an aqueous solution containing 0.5 g. of zinc chloride and 3.7 g. of potassium chloride were mixed together with 100 ml. of silica gel, and the mixture was vaporized to dryness over a water bath to prepare a catalyst. 1 ml. of this catalyst was mixed with 1 ml. of quartz sand, and the mixture was filled in a glass reaction tube having an inner diameter of 10 mm. and was maintained in a nitre bath kept at 350° C. To the reaction tube, a mixed gas comprising isobutylene, hydrogen cyanide, oxygen, hydrogen chloride and nitrogen in a volume ratio of 2:1:1:1:10 was fed at a flow rate of 100 ml./min. After 1 hour from the initiation of reaction, 20.5% of the fed isobutylene reacted and $\beta,\beta$-dimethylacrylonitrile was obtained in 88.5% yield. Even after 10 hours from the initiation of reaction, the results were substantially the same.

EXAMPLE 134

An aqueous hydrochloric acid solution containing 1.8 g. of palladium chloride and an aqueous solution containing 0.5 g. of zinc chloride and 8.4 g. of cesium chloride were mixed together with 100 ml. of silica gel, and the mixture was vaporized to dryness over a water bath to obtain a catalyst. 12 mil. of this catalyst was mixed with 12 ml. of quartz sand, and the mixture was filled in a hard glass reaction tube having an inner diameter of 12 mm., and was maintained in a nitre bath kept at 360° C. To the reaction tube, a mixed gas comprising ethylene, hydrogen cyanide, oxygen, hydrogen chloride and nitrogen in a volume ratio of 50:3:5:5:37 was fed. The conversion of hydrogen cyanide was 98% and the yield of acrylonitrile was 83.2%. Even after 40 hours from the initiation of reaction, the above reaction results were maintained.

EXAMPLE 135

8 ml. of a catalyst prepared by supporting 1.8 g. of palladium chloride and 1.7 g. of potassium iodide on 100 ml. of silica gel was filled in a Pyrex glass-made reaction tube having an inner diameter of 12 mm. and was maintained at 260° C. To the reaction tube, a mixed gas comprising propylene, hydrogen cyanide, oxygen, hydrogen chloride and nitrogen in a volume ratio of 7:1:1:2:6 was fed at a flow rate of 80 ml./min. After 30 minutes from the initiation of reaction the yields of methacrylonitrile and crotononitrile were 30.8% and 32.9%, respectively, based on the fed hydrogen cyanide.

EXAMPLE 136

An aqueous hydrochloric acid solution containing 1.8 g. of palladium chloride and an aqueous solution containing 1.2 g. of potassium bromide were mixed together with 100 ml. of silica gel, and the mixture was vaporized to dryness over a water bath to obtain a catalyst. 8 ml. of this catalyst was filled in a reaction tube having an inner diameter of 12 mm., and was maintained at 260° C. To the reaction tube, a mixed gas comprising propylene, hydrogen cyanide, oxygen, hydrogen chloride and nitrogen in a volume ratio of 7:1:2:1:6 was fed at a flow rate of 80 ml./min. After 30 minutes from the initiation of reaction, the yields of methacrylonitrile and crotononitrile were 37.8% and 59.5% based on the fed hydrogen cyanide.

What is claimed is:
1. A process for producing lower olefinic nitriles of the formula:

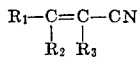

wherein $R_1$, $R_2$ and $R_3$ are independently selected from the group consisting of hydrogen and methyl, with the proviso that not more than two members thereof are methyl which comprises catalytically reacting, in the gas phase, at a temperature of from 100° C. to 500° C., a gaseous mixture containing a lower aliphatic olefin selected from the group consisting of ethylene, propylene, normal butylene and isobutylene; hydrogen cyanide and a gas selected from the group consisting of oxygen and molecular oxygen containing gases in the presence of a hydrogen halide selected from the group consisting of hydrogen chloride, bromide and iodide and a catalyst selected from the group consisting of palladium; rhodium; divalent palladium and trivalent rhodium oxides, hydroxides, chlorides, bromides, iodides, nitrates, sulfates, sulfides, cyanides, thiocyanides, oxalates, acetates, monochloroacetates, dichloroacetates and salicylates.

2. A process according to claim 1 wherein there is added to the catalyst at least one compound selected from the group consisting of the chlorides, bromides, iodides, sulphates, nitrates, phosphates, oxides, hydroxides, cyanides, thiocyanides, acetates, oxalates, and citrates of lithium, sodium, potassium, rubidium, cesium, magnesium, strontium, barium, calcium, trivalent indium, trivalent thallium, trivalent antimony, trivalent bismuth, divalent copper, zinc, cadmium, trivalent iron, trivalent chromium, pentavalent molybdenum, divalent manganese and trivalent cerium.

3. A process according to claim 1 wherein the amount of hydrogen cyanide is from 20 to $\frac{1}{50}$ part by volume per part of lower aliphatic olefin, the amount of oxygen is $\frac{1}{1000}$–1 part by volume per part of the sum of the volumes of hydrogen cyanide and lower aliphatic olefin, and the amount of hydrogen halide is from 20 to $\frac{1}{100}$ part by volume per part of hydrogen cyanide.

4. A process according to claim 1 wherein the gaseous mixture is passed over the catalyst at a space velocity of from 20 hr.$^{-1}$ to 20,000 hr.$^{-1}$.

5. A process according to claim 1 wherein the oxygen or molecular oxygen-containing gas is accompanied by at least one member of the group consisting of nitrogen, carbon dioxide, carbon monoxide, steam, methane, ethane, propane and butane.

6. A process according to claim 1 wherein the catalyst is supported on a carrier selected from the group consisting of carbon, alumina, silica, silica-alumina and a molecular sieve.

References Cited

UNITED STATES PATENTS 3,407,223  10/1968  Kominami et al. ___ 260—465.3

JOSEPH P. BRUST, Primary Examiner

U.S. Cl. X.R.

260—656, 663

UNITED STATES PATENT OFFICE
CERTIFICATE OF CORRECTION

Patent No. 3,553,246                    Dated   January 5, 1971

Inventor(s)   Naoya Kominami et al.

It is certified that error appears in the above-identified patent and that said Letters Patent are hereby corrected as shown below:

In the heading to the printed specification, line 5, "Takio Sakurai" should read -- Tokio Sakurai --.

Signed and sealed this 16th day of May 1972.

(SEAL)
Attest:

EDWARD M. FLETCHER, JR.                 ROBERT GOTTSCHALK
Attesting Officer                       Commissioner of Patents